Aug. 28, 1945.   E. A. ROCKWELL   2,383,618
POWER UNIT SYSTEM
Filed June 18, 1940   3 Sheets-Sheet 1
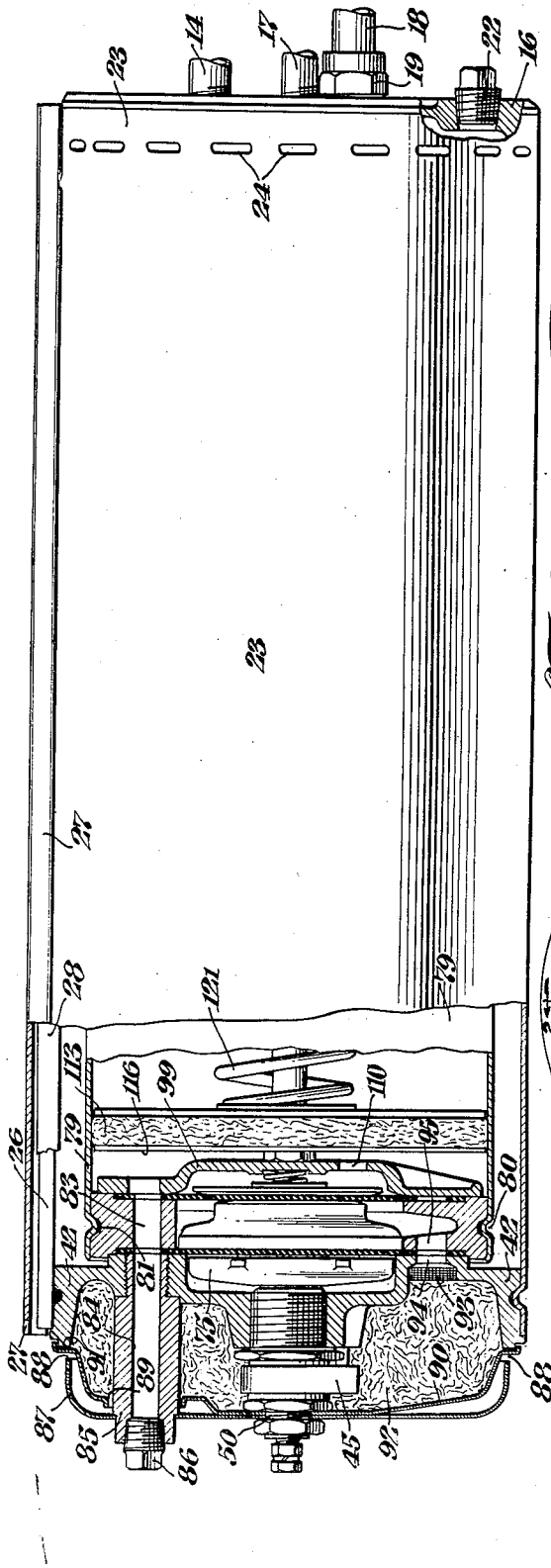
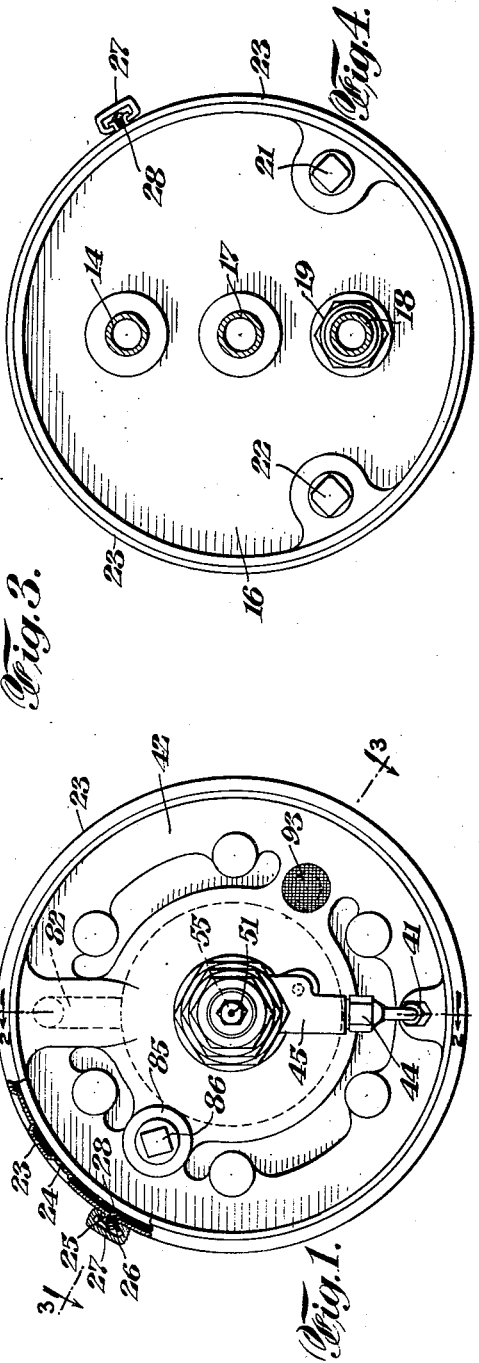
INVENTOR
Edward A. Rockwell
BY
Arthur Wright
ATTORNEY Aug. 28, 1945.   E. A. ROCKWELL   2,383,618
POWER UNIT SYSTEM
Filed June 18, 1940   3 Sheets-Sheet 2
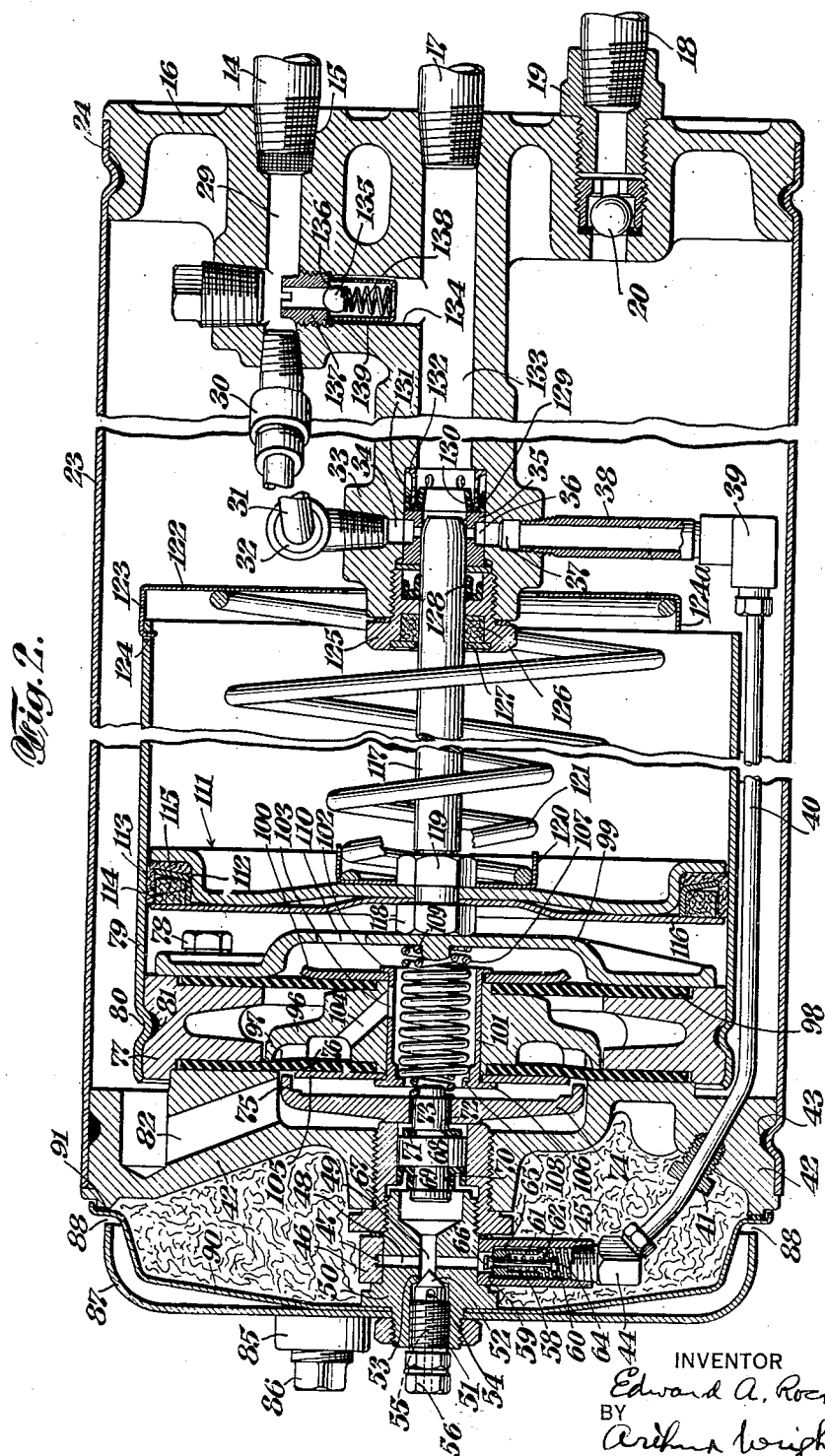
INVENTOR
Edward A. Rockwell
BY
Arthur Wright
ATTORNEY Aug. 28, 1945.　　E. A. ROCKWELL　　2,383,618
POWER UNIT SYSTEM
Filed June 18, 1940　　3 Sheets-Sheet 3
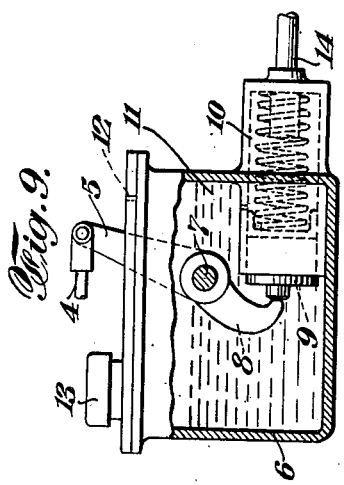
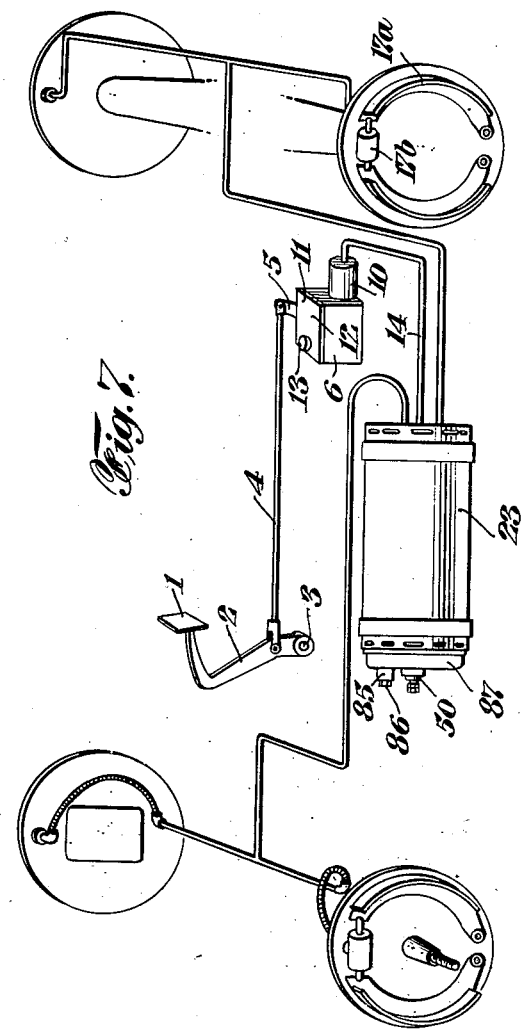
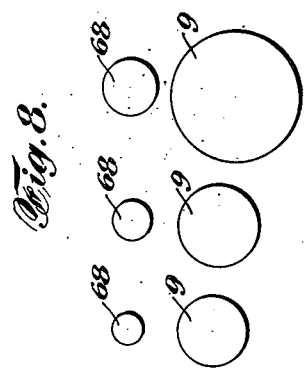
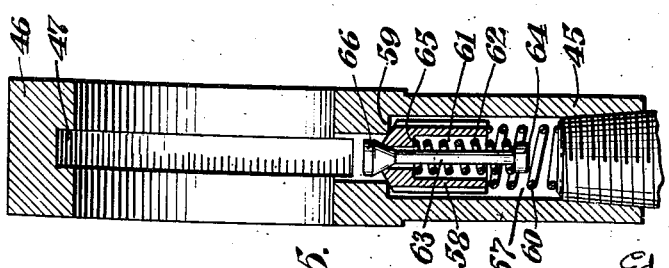
INVENTOR
Edward A. Rockwell
BY
Arthur Wright
ATTORNEY Patented Aug. 28, 1945

2,383,618

UNITED STATES PATENT OFFICE 2,383,618

POWER UNIT SYSTEM

Edward A. Rockwell, West Hartford, Conn., assignor to The New Britain Machine Co., New Britain, Conn., a corporation of Connecticut Application June 18, 1940, Serial No. 341,104

11 Claims. (Cl. 60—54.6)

My invention relates particularly to an improved form of power unit system and which is applicable especially for the delivery of power on automotive vehicles, such, for instance, as automobiles, or for the operation of accessories thereon, such for instance as wheel brakes.

The present application relates to a power unit system which is an improvement over the power unit as set forth in my application upon Power system, Ser. No. 239,436, filed November 8, 1938.

The object of my invention is to provide an improved form of power unit of the character above referred to, so as to more effectively deliver the power for the operation of the said accessories and wherever power is to be applied. One of the objects of my invention is to provide means whereby the brakes or other accessories may be more effectively operated manually in the case of the failure of the power, as for instance the vacuum applied to the said power unit. Another object is to provide a more effective means for insuring the initial application of the manual force for moving the accessory into its initial position, as for instance before the actual application of the braking force to the wheels, and so as to thereby prevent initially the application of pressures from the power of the power unit on the accessory before the manual force has accomplished the said initial movement. Another object is to provide an advantageous form of container for the unit in which the fluid pressure medium is carried and in which the moving parts are submerged. A further object is to provide means whereby the volume of liquid delivered from the power unit to the accessory may be stepped up by increasing the area of a plunger associated with the power unit as well as the area of the master cylinder piston, so as to accommodate the plunger to the various master cylinder piston sizes and pedal ratios for larger vehicles. Another object is to provide for the operation of another power unit from the power of one of the power units. Further objects of my invention will appear from the detailed description of the same hereinafter.

While my invention is capable of being carried out in many different ways, by way of illustration I have shown only one form of the apparatus in the accompanying drawings, in which—

Fig. 1 is an end elevation of a power unit made in accordance with my invention;

Fig. 2 is a longitudinal section of the same taken on line 2—2 of Fig. 1;

Fig. 3 is a view of the apparatus partly in section taken on line 3—3 of Fig. 1;

Fig. 4 is an elevation of the unit taken at the right hand end of Figs. 2 and 3;

Fig. 5 is a transverse section of the valve used for controlling the delivery of the liquid from the master cylinder to the operating parts of the power unit;

Fig. 6 is an end elevation of the valve shown therein;

Fig. 7 is a perspective view showing the master cylinder as connected to the power unit and the pedal;

Fig. 8 is a diagrammatic view showing the relative sizes of the master cylinder pistons and, by way of example, three alternative sizes of plungers adapted to be used therewith, respectively, in the power unit for receiving the liquid from the master cylinder, which are smaller in area than the master cylinder pistons, the area of the plunger chosen being larger according to the increase in volume of liquid desired to be applied from the power unit to the accessory; and Fig. 9 is an enlarged vertical section of the master cylinder.

In the drawings, I have shown a pedal 1 mounted on a lever 2 which is pivoted on a shaft 3 carried by a chassis of an automobile, not shown. A link 4 is attached to said lever 2 intermediate its ends so as to give any desired pedal ratio movement of the foot pedal 1 to the brake-operating link 4. The said link is pivotally connected to an operating lever 5 of a master cylinder 6, which may be any desired form of master cylinder but, for example, such as disclosed in the patent to Loughead, No. 1,707,063, granted March 26, 1929. The lever 5 is carried on a shaft 7 passing into the master cylinder 6 which has an arm 8 for operating a master cylinder piston 9 carried in a cylinder 10 within a storage chamber 11 having a vent 12 and a filler opening 13. When the pedal 1 is moved downwardly the piston 9 is adapted to discharge liquid from the master cylinder by a pipe 14 to an inlet opening 15 located in a head 16 of the power unit. The said head is also connected to a discharge pipe 17 leading to the usual wheel cylinders 17b operating shoes 17a on the brakes of the wheels of the automobile chassis and illustrated in my prior application upon Power system above referred to. Also, as shown in said prior application, for example, the said head 16 is connected by a pipe 18 leading to the engine manifold or any other source of vacuum, the same being received in a fitting 19 having a check valve 20 therein.

Screw plugs 21 and 22 located in said head 16 give access to the interior of the power unit.

The said head 16 acts as a closure for a sheet metal container 23 forming the outside of the power unit and is attached thereto by the container being forced at intervals around its periphery in recesses 24 in said head carrying any desired sealing cement. It will be noted that the container 23 is in the form of a cylindrical shell having two adjacent U-shaped flanges 25 and 26 which are held together by a longitudinal channel bar 27 adapted to be slid over the flanges longitudinally and seal the same by clamping a rubber strip 28 between the flanges.

The liquid from the master cylinder 6 is conveyed through a passageway 29 in the head 16 and thence through a fitting 30 and pipe 31 to a right angle fitting 32 carried on the end of a cylindrical extension 33 forming a part of the head 16. The said fitting 32 delivers the liquid into a circular recess 34 and thence into a bushing 35 also having a circular recess 36 so as to communicate with a passageway 37, which conveys the liquid by a pipe 38 to a right angle fitting 39 which is connected by a pipe 40 passing through a sleeve 41 screw-threaded in a casting 42 at the other end of the container 23, which is attached to said container by means of indentations therein forced from the container in recesses 43 having sealing means as in the case of the recesses 24. This end of the said pipe 40 is connected to an angular fitting 44 which is screw-threaded into an extension 45 on a sleeve 46 provided with a circular passageway 47 communicating with radial ports 48 leading to a central passageway 49 in a bleeder valve housing 50.

The bleeder valve housing 50 has screw-threaded therein a bleeder valve 51 having a conical end 52 cooperating with a valve seat 53 in the passageway 49. When the valve 51 is unscrewed air can pass by a transverse port 54 into a longitudinal passageway 55 to a point beneath a screw-plug 56 which, when removed, enables the air to escape when desired.

The liquid thus received in the extension 45 enters a passageway 57 in which there is contained means to prevent the feeding of the liquid to the unit too rapidly initially and so as to thereby prevent the power mechanism of the power unit being actuated until after the manual force alone has moved the brake shoes, as for instance up to the point where they are in position to apply the brake force. This is comprised of a valve member 58 triangular in cross-section, which is forced on a valve seat 59 by a spring 60 but which is adapted to be unseated therefrom by the reverse flow of the pressure liquid. In the interior of the valve member 58 there is a passageway 61 containing a spring 62 located around a valve stem 63 and which is seated against an enlargement 64 at one end of said valve stem and at the other end against a shoulder 65 in the passageway 61. Said other end of the valve stem 63 carries a conical valve 66 which is normally seated against its seat on the end of the valve member 58 by means of said spring 62. Thus the valve 66 is unseated initially only to a sufficient extent to allow a restricted amount of liquid to pass by the same and allow the brake shoes to be moved initially merely by the manual force of the liquid and so as to prevent, in the initial movement of the brake shoes, the application thereto of the power unit.

The bleeder valve housing 50 is screw-threaded into a cylinder 67 which in turn is screw-threaded into the casting 42. This permits the casting 42 to be made of a cheaper casting material which need not be liquid-tight, as the cylinder 67 is a part that is tight to liquid of high pressure. This also avoids long drilling operations.

The said cylinder 67 carries a plunger 68 therein, of which there may be several different sizes, as shown in Fig. 8, in which there are illustrated, by way of example, three diameters of the plungers 68 with the relative diameters of the master cylinder pistons used therewith, it being understood that the pedal lever ratio for each set of diameters will be adjusted therewith to always obtain approximately the same ratio of force from the piston to the force obtained from its plunger in each of the three pairs of pistons and plungers. The plunger 68 has a rubber seal 69 supported in an annular recess 70 thereon at one end of the plunger and the other end thereof having a seal 71 supported in a recess 72 on a cylindrical extension 73 at its other end, to which there is fastened an outlet valve 74 provided with an annular flange 75 which is adapted to seat, in the closed position of the valve, against a diaphragm 76 of rubber or any other similar material, which is supported on one face of the casting 42 and clamped against the same by means of an annular spacing member 77 and screws 78.

Said spacing member 77 supports on its periphery a cylinder 79 which is secured thereto by indentations 80 and a sealing compound 81. The cylinder 79 is submerged in the vacuum located on the outside of the cylinder 79 and within the container 23 and the said vacuum is communicated by a passage 82 from the space between the container 23 and the cylinder 79 to the valve 74. Passing through the said spacing member 77 there is also a passageway 83 which communicates with a passageway 84 in a pipe 85, provided for operating another power unit therefrom on the same vehicle or a trailer in the usual way, which is screw-threaded into the casting 42. This pipe 85 is closed normally by a plug 86. The pipe 85 extends through a cap 87 supported by the bleeder valve housing 50 and which has around its inner edge an open space 88 for the admission of air through an annular air inlet opening 89 in a cover 90, also supported on the bleeder valve housing 50 and at its periphery on the casting 42. A gasket 91 makes a dust-tight joint at this point.

The cover 90 has within the same a body of horse-hair 92 to filter out any dust from the air admitted to the unit. The said air, after passing through the body of horse-hair 92, is then conveyed through a screen 93 and a passageway 94 in the casting 42 to a similar passageway 95 in the spacing member 77 so as to be supplied thereby to an air inlet valve 96 located within the spacing member 77 and which has a flange 97 also seating on the diaphragm 76.

The said valve 96 is supported by means of a diaphragm 98 of rubber or similar material, clamped at its periphery to one face of the spacing member 77 by a clamping plate 99 with the aid of the said screws 78. The inlet valve 96 is fastened to the central portion of the diaphragm 98 by a ring 100 and a sleeve 101 having a flange 102 for this purpose. The side of the said sleeve 101 has one or more ports 103 communicating with passages 104 leading to the interior of the inlet valve 96. Furthermore, the said valve 96 is secured to the central portion of the diaphragm 76 by means of a ring 105 and a flange 106 located at this end of the sleeve 101. In this way it will be noted that the two diaphragms 76 and 98 are secured together with the inlet valve 96 at their central portions.

In the interior of the sleeve 101 a helical spring 107 is seated at one end against a shoulder 108 within the said sleeve and at the other end against the face of the clamping plate 99 and thus normally tends to move the inlet valve 96 to the left in Fig. 2, so as to seat the inlet valve 96 on the diaphragm 76 opposite to a portion of the casting 42. Within the said spring 107 there is a smaller spring 109 which seats at one end around a reduced extension on the cylindrical clamping plate 99 and at the other end against the plunger 73, thus tending to normally unseat the outlet valve 74.

It will be noted that the clamping plate 99 has therein one or more ports 110 so as to give access for the pressure medium to the face of a piston 111 which is adapted to move within the cylinder 79. The said piston 111 is provided with a right angle recess 12 at its periphery to receive a leather gasket 113 having a right angle cross-section and which is maintained in position by a spring ring 114 cooperating with a ring 115 of felt or similar material. A retainer disk 116 is provided for keeping the gasket 113, the felt ring 115 and the spring ring 114 in position. The said piston 111 and the retainer plate 116 are clamped together on a piston plunger rod 117 by means of nuts 118 and 119, which also clamp in position a spring retaining cup 120 for receiving one end of a coil spring 121, the other end of which is supported by a plate 122 having three or more spaced ears 123 bent into openings 124 on the cylinder 79 and a supporting flange 124a for holding the said spring in place.

The rod 117, at its right hand end in Fig. 2, acts as a plunger and for this purpose passes through a sleeve 125 having a packing 126 held in place by a split ring 127 and a rubber sealing ring 128. The said sleeve 125 is screw-threaded into the extension 33 of the head 16 so as to permit the plunger 117 to pass through a central passageway 129 in the bushing 35. When the piston 111 is moved to the right, in Fig. 2, the said plunger 117 passes through an annular seal 130 held in place by a perforated flanged ring 131, the flanged end of which seats against a shoulder 132. The continued movement of the plunger 117 in this direction causes the plunger to enter a cylindrical chamber 133 in the said extension 33 so as to place the liquid therein under a high pressure of from 1000 to 1500 pounds per square inch, and thus supply the same by the pipe 17 to the wheel cylinders for operating the brakes of the automobile.

Should the vacuum from the manifold be ineffective for any reason it will be understood that the brakes of the automobile can be operated manually, nevertheless, and this is facilitated in accordance with my present invention by providing a cross-passageway 134 leading from the inlet port 29 to the interior of the cylindrical chamber 133, and which is normally closed by a ball check valve 135 normally pressed against its seat 136 in a screw-threaded valve member 137. The ball valve 135 is thus forced against said seat by a spring 138 carried in a flanged spring housing 139 supported within the passageway 134 and secured therein by the screw-threaded valve member 137.

In the operation of the power unit made in accordance with my invention, when the brakes are to be applied the pedal 1, having any desired pedal ratio, is pushed downwardly thus operating the lever 5 on the master cylinder 6 and moving the piston 9 to the right. The liquid is thus forced by the piston 9 through the pipe 14 and thence into the power unit and by means of passageways 29, 31, 34 and 36, thence into the cylindrical chamber 133 so as to be supplied to the brake cylinders for moving the shoes manually into snugly fitting position so that upon further increase of the hydraulic power applied thereto the braking force will be further applied to the wheel cylinders by the application of power.

It will be understood that if for any reason the vacuum is ineffective the braking force can be quickly and effectively applied manually by increasing the pressure applied to the pedal. This is accomplished with the avoidance of lag, and even if the plunger 117 should, for any reason, have entered the seal 130, by the hydraulic liquid being forced past the check valve 135 into the cylinder 133 and thence to the brakes.

In the normal operation of the apparatus, as the pedal pressure is increased the liquid is conveyed from the passageway 36 around the end or side of the plunger 117 to the passageways 37, 38 and 40 into the valve passageway 61 where the spring-retracted valve 66 permits, initially, only a restricted flow of the liquid so as thus to exert the manual force for bringing the power unit into action only after the brake shoes have been moved into position manually. Due to the initial restricted flow of the liquid the plunger 68 is prevented from being operated too suddenly by the sudden application of the foot pressure, thus avoiding the possibility, which would otherwise be present, of the piston 111 being moved before the manual force on the hydraulic liquid has moved the brake shoes into the position and before increasing the braking force.

This plunger 68, as referred to above, may be of various sizes, as shown in Fig. 8, so that a plunger of increasing size may be chosen according to the increase in size of the master cylinder piston used to obtain increased volume of liquid in operating heavier vehicles, such as heavy-duty trucks, etc. However, the master cylinder piston and the plunger 68 used are of such relative sizes as to obtain for all vehicles the same ratio of force on the plunger 68 to the force exerted on the piston 111, approximately, so as to maintain the same foot-pressure range. It will be understood, however, that the area of each of these plungers is smaller than the area of the master cylinder piston as thereby a decreased force is obtained as compared with the force delivered by the master cylinder piston. Of course, in substituting a different size plunger 68 a cylinder 67 will be used to fit the same.

The plunger 68 is thus moved by the increase of the manual pressure until the outlet valve 74 becomes seated on the diaphragm 76 and thereafter the inlet valve 96 is moved off its seat on the said diaphragm by the force exerted on the cylindrical member 73. This shuts off the vacuum from access through the sleeve 101 to the left face of the piston 111, in Fig. 2, and admits the air from the atmosphere through the space 88, inlet 89, passageways 94 and 95 and beneath the inlet valve 96 through the ports 103, sleeve 101 to the said face of the piston 111.

Consequently, owing to the vacuum which is present on the right face of the said piston 111, the pressure of the atmospheric air forces the plunger 117 to the right against the force of the spring 121, thereby trapping the liquid in the cylindrical chamber 133 and thus producing a greatly magnified maximum pressure of from 1000 to 1500 pounds per square inch in the cylindrical chamber 133 as compared with the pressure received from the master cylinder for controlling the brakes, of from 0 to 500 pounds per square inch. However, the plunger 117 begins to move to the right when the pressure in the cylinder 133 reaches 150 pounds per square inch. This results in the braking force being applied to the brake shoes.

The braking effect, when the brakes are set, is obtained by modulated pressures, producing reactions on the foot coordinated with the pressures applied on the brake cylinders, and this is accomplished merely by the movement of comparatively small amounts of the hydraulic liquid by the foot and at the very high pressures obtained from the power unit to the brake cylinders.

While I have described my invention above in detail I wish it to be understood that many changes may be made therein without departing from the spirit of the same.

I claim:

1. A power unit comprising means for delivering a manually supplied fluid to said unit for controlling the said unit, movable means in said unit adapted to deliver from the unit a fluid under a pressure greater than the manual pressure, a source of pressure fluid differing from the atmospheric pressure for actuating said movable means, a control means controlling the movement of the movable means, and a valve, having a pressure-responsive mounting, adapted to control the delivery of the manually supplied fluid so as to actuate the control means at a predetermined pressure.

2. A power unit comprising means for delivering a manually supplied hydraulic liquid to said unit for controlling the said unit, movable means in said unit adapted to deliver from the unit a fluid under a pressure greater than the manual pressure, a source of pressure fluid differing from the atmospheric pressure for actuating said movable means, a control means controlling the movement of the movable means, and a spring-restrained forwardly feeding and reverse flow relief valve adapted to permit the forward passage through the valve only of an amount determined by said spring of the manually supplied hydraulic liquid so as to actuate the control means at a predetermined pressure.

3. A power unit comprising means for delivering a manually supplied liquid to said unit for controlling the said unit, movable means in said unit adapted to deliver from the unit a fluid under a pressure greater than the manual pressure, a source of pressure fluid differing from the atmospheric pressure for actuating said movable means, a control means controlling the movement of the movable means, and a pressure-responsive forwardly feeding valve mounted in a reverse-flow relief valve, adapted to control the delivery of the manually supplied liquid so as to actuate the control means at a predetermined pressure but permit the reverse flow of the liquid.

4. A power unit comprising means for delivering a manually supplied hydraulic liquid to said unit for controlling the said unit, movable means in said unit adapted to deliver from the unit a fluid under a pressure greater than the manual pressure, a source of pressure fluid differing from the atmospheric pressure for actuating said movable means, a control means controlling the movement of the movable means, and a spring-restrained pressure-responsive forwardly feeding valve mounted in a spring-pressed reverse-flow valve adapted to retard the delivery of the liquid so as to actuate the control means at a predetermined pressure.

5. A power unit comprising means for delivering a manually supplied hydraulic liquid thereto for controlling the said unit, means therein for delivering therefrom a fluid under a pressure greater than the manual pressure supplied, a source of pressure fluid different from the atmospheric pressure for actuating said means, and a cylindrical enclosure for said unit containing said pressure fluid differing from the atmospheric pressure, having longitudinal adjacent flanges and a channel bar clamping the flanges together.

6. A power unit comprising means for delivering a manually supplied hydraulic liquid thereto for controlling the said unit, means therein for delivering therefrom a fluid under a pressure greater than the manual pressure supplied, a source of pressure fluid differing from the atmospheric pressure for actuating said means, and a cylindrical enclosure for said unit containing said pressure fluid differing from the atmospheric pressure, having longitudinal adjacent flanges, an intervening elastic strip and a channel bar clamping the flanges together.

7. A power unit having an inlet for a manually controlled hydraulic liquid, a hydraulic connection therefrom leading to a part to be operated, a source of pressure fluid differing from the atmospheric pressure, a movable wall, valve means in the unit comprising inlet and outlet valves for controlling said movable wall from said pressure fluid, an enclosure for said valves, a plunger in the manually controlled hydraulic liquid, said plunger being removably associated with said valve means a spring seating against the plunger for operating the latter and a cylinder, in which said plunger slides, removably mounted on said enclosure, arranged to enable plungers and cylinders of different diameter to be associated with said valve means.

8. A power unit having an inlet for a manually controlled hydraulic liquid, a hydraulic connection therefrom leading to a part to be operated, a source of pressure fluid differing from the atmospheric pressure, a movable wall, valve means in the unit comprising inlet and outlet valves for controlling said movable wall from said pressure fluid, an enclosure for said valves, a plunger in the manually controlled hydraulic liquid, said plunger being removably inserted in said valve means a spring seating against the plunger for operating the latter and a cylinder, in which said plunger slides, removably mounted on said enclosure, arranged to enable plungers and cylinders of different diameter to be associated with said valve means.

9. A power unit having an inlet for a manually controlled hydraulic liquid, a hydraulic connection therefrom leading to a part to be operated, a source of pressure fluid differing from the atmospheric pressure, a movable wall, valve means in the unit comprising inlet and outlet valves for controlling said movable wall from said pressure fluid, an enclosure for said valves, a plunger in the manually controlled hydraulic liquid, said plunger being removably inserted in said valve means for operating the latter, a cylinder, in which said plunger slides, removably mounted on said enclosure, arranged to enable plungers and cylinders of different diameter to be associated with said valve means a peripheral seal located around the plunger and a retracting spring seated against the plunger.

10. A power unit having an inlet for a manually controlled hydraulic liquid, a hydraulic connection therefrom leading to a part to be operated, a source of pressure fluid differing from the atmospheric pressure, a movable wall, valve means in the unit comprising inlet and outlet valves for controlling said movable wall from said pressure fluid, a plunger of smaller diameter than said valves in the manually controlled hydraulic liquid on which plunger one of said valves is mounted, said plunger being removably inserted in said valve means for operating the latter, and a spring for normally retracting the plunger removable through the plunger opening in the valve means.

11. In a device of the character indicated, a power unit comprising a fluid pressure actuated member, valve means for controlling pressure fluid for actuation of said member, hydraulically actuated means for actuating said valve means, an hydraulic cylinder, a plunger operable therein and actuable by said fluid pressure actuated member, a low pressure hydraulic connection to said hydraulically actuated means and to said hydraulic cylinder, means for cutting off communication between said low pressure hydraulic connection and said hydraulic cylinder when said plunger is advanced in said cylinder, and a second hydraulic connection between said low pressure hydraulic connection and said hydraulic cylinder, and a check valve in said second hydraulic connection and opening toward said cylinder, whereby low pressure hydraulic fluid may be forced through said second connection past said check valve when said first mentioned hydraulic connection to said hydraulic cylinder is cut off, for the purpose set forth.

EDWARD A. ROCKWELL.